US010111387B1

(12) United States Patent
Derscheid et al.

(10) Patent No.: US 10,111,387 B1
(45) Date of Patent: Oct. 30, 2018

(54) BAFFLE FLOAT SYSTEM FOR BALER (71) Applicant: Deere & Company, Moline, IL (US)

(72) Inventors: Daniel E. Derscheid, Hedrick, IA (US); Robert J. Naeger, Ottumwa, IA (US)

( * ) Notice: Subject to any disclaimer, the term of this patent is extended or adjusted under 35 U.S.C. 154(b) by 0 days.

(21) Appl. No.: 15/582,247

(22) Filed: Apr. 28, 2017

(51) Int. Cl.
*A01D 89/00* (2006.01)
(52) U.S. Cl.
CPC ................ *A01D 89/002* (2013.01)
(58) Field of Classification Search
CPC .. A01D 75/182; A01D 89/002; A01D 89/008; A01F 15/106; A01F 15/07; A01F 15/14; A01F 15/141; A01F 29/10
USPC ........ 56/190, 341, 343, 364; 100/15, 31, 88; 460/2
See application file for complete search history.

(56) References Cited

U.S. PATENT DOCUMENTS

| 5,479,767 | A | * | 1/1996 | McClure ................. A01F 15/07 100/15 |
| 5,913,805 | A | * | 6/1999 | Vodon .................... A01F 15/07 100/88 |
| 6,688,092 | B2 | | 2/2004 | Anstey et al. |
| 7,448,196 | B2 | | 11/2008 | Schrag et al. |
| 7,617,662 | B2 | | 11/2009 | Erdmann et al. |
| 7,823,371 | B2 | | 11/2010 | Gantzer et al. |
| 8,186,137 | B2 | * | 5/2012 | Viaud .................. A01F 15/106 56/190 |
| 8,206,205 | B2 | * | 6/2012 | Derscheid ............. A01F 29/10 460/2 |
| 2016/0088800 | A1 | | 3/2016 | Lang et al. |

FOREIGN PATENT DOCUMENTS

EP  2 777 379 A1  9/2014
FR  2 524 765 A1  10/1983

OTHER PUBLICATIONS

Extended European Search Report for EP 18 16 6445 dated Aug. 23, 2018, 6 pages.

* cited by examiner

*Primary Examiner* — Robert E Pezzuto
(74) *Attorney, Agent, or Firm* — Klintworth & Rozenblat IP LLP; Steven J. Wietrzny (57) ABSTRACT

A baffle float system for a baler is provided. The baffle float system includes a pair of first pivot arms configured to pivotally couple to a frame of the baler and to a cross-member. The first pivot arms pivot about a first pivot axis. The baffle float system includes a baffle coupled to the cross-member. The baffle float system includes a pair of second pivot arms having a first end coupled to the cross-member and a second end. The baffle float system includes a compressor rack coupled to the second end of each of the second pivot arms such that the compressor rack pivots relative to the second end along a second pivot axis. The second pivot axis is different than the first pivot axis. The baffle float system includes at least one biasing member coupled to the compressor rack so as to be offset from the second pivot axis.

20 Claims, 8 Drawing Sheets

BAFFLE FLOAT SYSTEM FOR BALER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to crop-packing devices, such as balers, and to a baffle float system for a baler.

BACKGROUND OF THE DISCLOSURE

In various settings, crops or other material may be arranged for pick-up by mechanized equipment. For example, cut material (e.g., hay) in a field may be raked or otherwise arranged into windrows in the field for further processing. Various mechanisms may then be utilized to gather such material. For example, a crop-packaging device such as a baler may be pulled by a tractor along a windrow of cut material and may gather the material from the windrow. The material may then be passed into a packaging (e.g., baling) chamber for formation into a crop package (e.g., a bale). In various configurations, such a crop package may be generally cylindrical in shape and may be typically referred to as a "round" bale. Similarly, a baler that forms a round bale may be referred to as a "round" baler. In other configurations, such a crop package may be generally rectangular in shape and may be typically referred to as a "rectangular" or "square" bale. Similarly, a baler that forms a rectangular or square bale may be referred to as a "square" baler.

Generally, the cut material is fed into a pickup on the baler, which directs the cut material in a packaging chamber for forming the bale. In certain conditions, for example, when the cut material is heavy and/or there is a large volume of the cut material, the cut material may plug the pickup. An operator then has to stop the baling operation to remove the cut material from the pickup, which reduces the efficiency of the baling operation.

SUMMARY OF THE DISCLOSURE

The disclosure provides a system and method for a baffle float system for a baler, which reduces plugging of a pickup of the baler with cut material.

In one aspect the disclosure provides a baffle float system for a baler. The baffle float system includes a pair of first pivot arms configured to pivotally couple to a frame of the baler and to a cross-member. The first pivot arms pivot about a first pivot axis. The baffle float system includes a baffle coupled to the cross-member. The baffle float system also includes a pair of second pivot arms having a first end coupled to the cross-member and a second end. The baffle float system includes a compressor rack coupled to the second end of each of the second pivot arms such that the compressor rack pivots relative to the second end along a second pivot axis. The second pivot axis is different than the first pivot axis. The baffle float system includes at least one biasing member coupled to the compressor rack so as to be offset from the second pivot axis.

In another aspect, the disclosure provides a baffle float system for a baler. The baffle float system includes a pair of first pivot arms configured to pivotally couple to a frame of the baler and to a cross-member. The first pivot arms pivot about a first pivot axis. The baffle float system also includes a baffle coupled to the cross-member. The baffle float system includes a pair of second pivot arms having a first end coupled to the cross-member and a second end. The baffle float system includes a compressor rack having a shaft with a plurality of flexible rods extending through the shaft. The shaft has a first shaft end and a second shaft end each coupled to the second end of a respective one of the second pivot arms. The shaft pivots relative to the second end along a second pivot axis. The second pivot axis is different than the first pivot axis. The baffle float system includes a pair of springs coupled to the compressor rack so as to be spaced apart from the shaft and offset from the second pivot axis.

In yet another aspect, the disclosure provides a baffle float system for a baler. The baffle float system includes a pair of first pivot arms configured to pivotally couple to a frame of the baler and to a cross-member. The first pivot arms pivot about a first pivot axis. The baffle float system includes a baffle coupled to the cross-member. The baffle float system also includes a pair of second pivot arms having a first end coupled to the cross-member and a second end. The baffle float system includes a compressor rack having a shaft with a plurality of flexible rods extending through the shaft. The shaft has a first shaft end and a second shaft end each coupled to the second end of a respective one of the second pivot arms. The shaft pivots relative to the second end along a second pivot axis. The second pivot axis is different than the first pivot axis. The baffle float system includes a pair of springs each having a first end and a second end. The first end is coupled to the compressor rack so as to be spaced apart from the shaft and offset from the second pivot axis, and the second end of each of the springs is coupled to the frame of the baler, in one example, a draw tongue of the baler.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As noted above, in various situations it may be useful to gather material (e.g., cut plant material) for further processing. For example, a cutting or raking operation may leave cut material (e.g., hay) arranged in windrows in a field. Balers and other equipment may then be used to gather the material from the windrows for formation into bales.

The following describes one or more example implementations of the disclosed system for a baffle float for a crop-packaging device, such as a baler, as shown in the accompanying figures of the drawings described briefly above. The following description relates to the baler that produces "round" bales or rectangular or "square" bales. It should be noted, however, that the present disclosure is not so limited. In this regard, the baler may produce bales of any dimension. Moreover, it will be understood, however, that the disclosed baffle float system may be utilized with a variety of crop-packaging devices. Generally, the disclosed systems provide for the improved feeding of the crop material, with reduced plugging of the crop material within a pickup of the crop-packaging device.

In this regard, the disclosed baffle float system includes two pivot axes, which are offset. The two pivot axes enable the baffle float system to substantially automatically adjust for the condition of the crop material. By automatically adjusting for the condition of the crop material, plugging is reduced, which improves the productivity and efficiency of the baling operation. Generally, the baffle float system includes a pair of primary pivot arms and a pair of secondary pivot arms, which each have an end coupled to a frame or cross-member. The primary pivot arms move or pivot with respect to a frame of the baler about a first pivot axis, and the secondary pivot arms enable a compressor rack of the baffle float system to move or pivot about a second pivot axis. A pair of springs is coupled to the compressor rack by a pair of spring mounting brackets, which are coupled to the compressor rack to be offset from the second pivot axis. Generally, the spring mounting brackets are coupled to the compressor rack to be behind the second pivot axis. By coupling the springs such that the springs are behind or offset from the second pivot axis, the springs can provide a resultant downforce to a plurality of flexible rods of the compressor rack, and thus, the crop material. Once the force of the springs is overcome due to a force of the crop material, the primary pivot arms pivot, which in turn pivots the remainder of the baffle float system, including a baffle coupled to the frame, to provide additional space for the crop material. Thus, the springs enable the baffle to float, while also providing a force to hold the flexible rods down against the crop material.

As noted above, with reference to FIG. 1, the system described herein may be employed with respect to a variety of crop-packaging devices, such as a baler 10. The baler 10 is configured to be towed by a tractor 12, and in this example is a "round" baler. The baler 10 may have a main frame 16 supported on a pair of ground wheels 18. The main frame 16 includes a draft tongue 17 having a rear end joined to the main frame 16 and a forward end defined by a clevis arrangement 19 adapted for being coupled to a drawbar (not shown) of the tractor 12. A pair of upright side walls 20 may be fixed to the main frame 16 to define forward regions of opposite side walls of a bale forming (or baling) chamber 22. Mounted for pivoting vertically about a horizontal pivot arrangement 24 located at an upper rear location of the side walls 20 is a discharge gate 26 including opposite upright side walls 28, which define opposite sides of a rear region of the bale forming chamber 22. One or more gate hydraulic cylinders 30 may be coupled between the main frame 16 and the opposite side walls 28 of the discharge gate 26 and are selectively operable for moving the discharge gate 26 between a lowered baling position and an opened discharge position. It is understood that while one hydraulic cylinder is shown, two or more hydraulic cylinders may be used to open and close the discharge gate 26. The baler 10 as shown is of a variable chamber design and thus comprises a plurality of longitudinally extending side-by-side belts (not shown) supported on a plurality of rollers (not shown). At least one of the rollers is driven, via a chain drive coupled to a motor or other arrangement, to drive the belts about the bale forming chamber 22.

Figure 1:
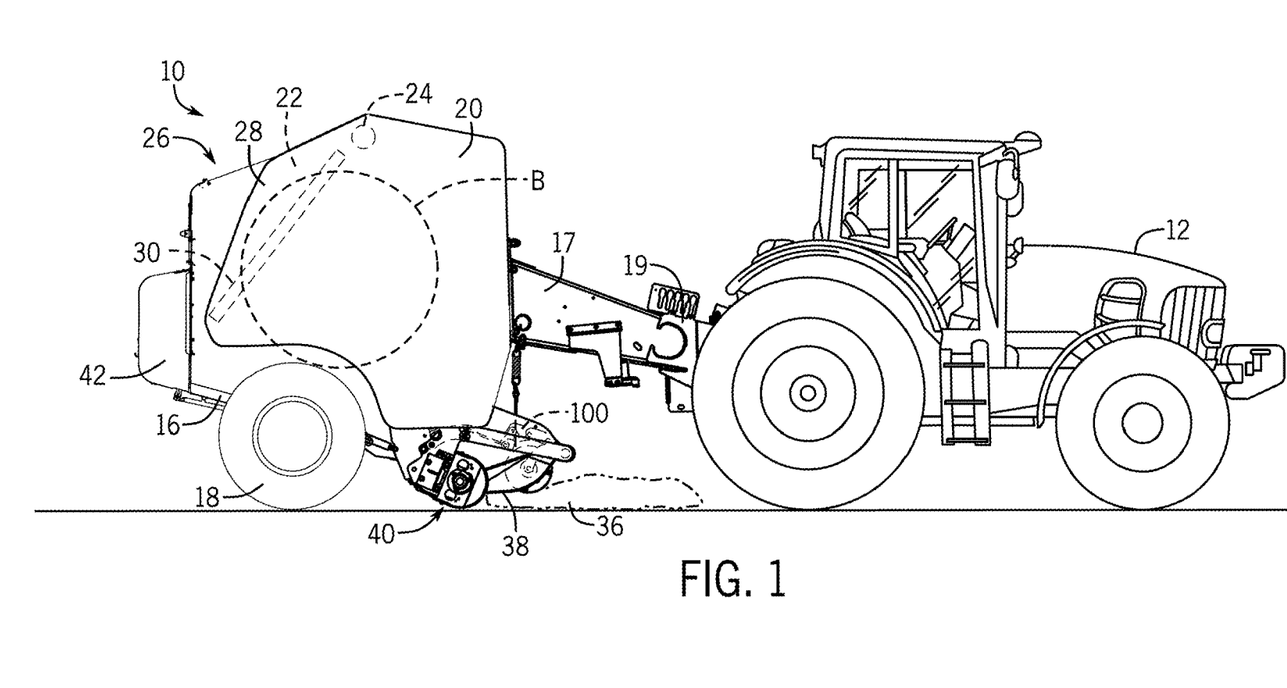
FIG. 1 is a perspective view of an example work vehicle in the form of a tractor, which includes an exemplary crop-packaging device, such as a baler, having a baffle float system according to various embodiments of this disclosure.

The baler 10 may also include one or more controllers, such as electronic controller unit (ECU). The controllers may be configured as computing devices with associated processor devices and memory architectures, as hydraulic, electrical or electro-hydraulic controllers, or otherwise. As such, the controllers may be configured to execute various computational and control functionality with respect to the baler 10 (and other machinery). The controllers may be in electronic, hydraulic, or other communication with various other systems or devices of the baler 10 (or machinery). For example, the controllers may be in electronic or hydraulic communication with various actuators, sensors, and other devices within (or outside of) the baler 10, including various devices associated with the bale forming chamber and related mechanisms. Additionally, one or more electro-hydraulic control valves (not shown) may be a part of a baler hydraulic system and interposed in hydraulic lines connecting the gate hydraulic cylinders 30 with a hydraulic supply associated with the tractor 12. The electro-hydraulic control valve may be electrically activated according to signals from the ECU and may be configured to control the flow of hydraulic fluid between the hydraulic supply associated with the tractor 12 and the gate hydraulic cylinders 30.

In its general operation, the baler 10 is drawn through a field by the tractor 12 attached to the draft tongue 17. Crop material 36 is fed into a crop inlet 38 of the bale forming chamber 22 from a windrow of crop on the ground by a pickup 40. As will be discussed with regard to FIG. 2, the pickup 40 includes a baffle float system 100 that directs the crop material 36 into the bale forming chamber 22. In the bale forming chamber 22, the crop material 36 is rolled in spiral fashion into a cylindrical bale B.

Upon completion, the bale B is wrapped, such as with twine, net or other appropriate wrapping material, via a wrap feed and cut-off system 42. Once the bale B is wrapped, and the bale B is discharged by actuation of gate hydraulic cylinders 30 that open discharge gate 26 permitting the completed bale B to be discharged from the baler 10 onto the ground. As mentioned previously, the baler 10 illustrated is a variable chamber design wherein crop is rolled up in a spiral fashion in a nip formed between oppositely moving adjacent loops of belts. The space between adjacent loops of belts grows as the forming bale B grows larger.

Figure 1A:
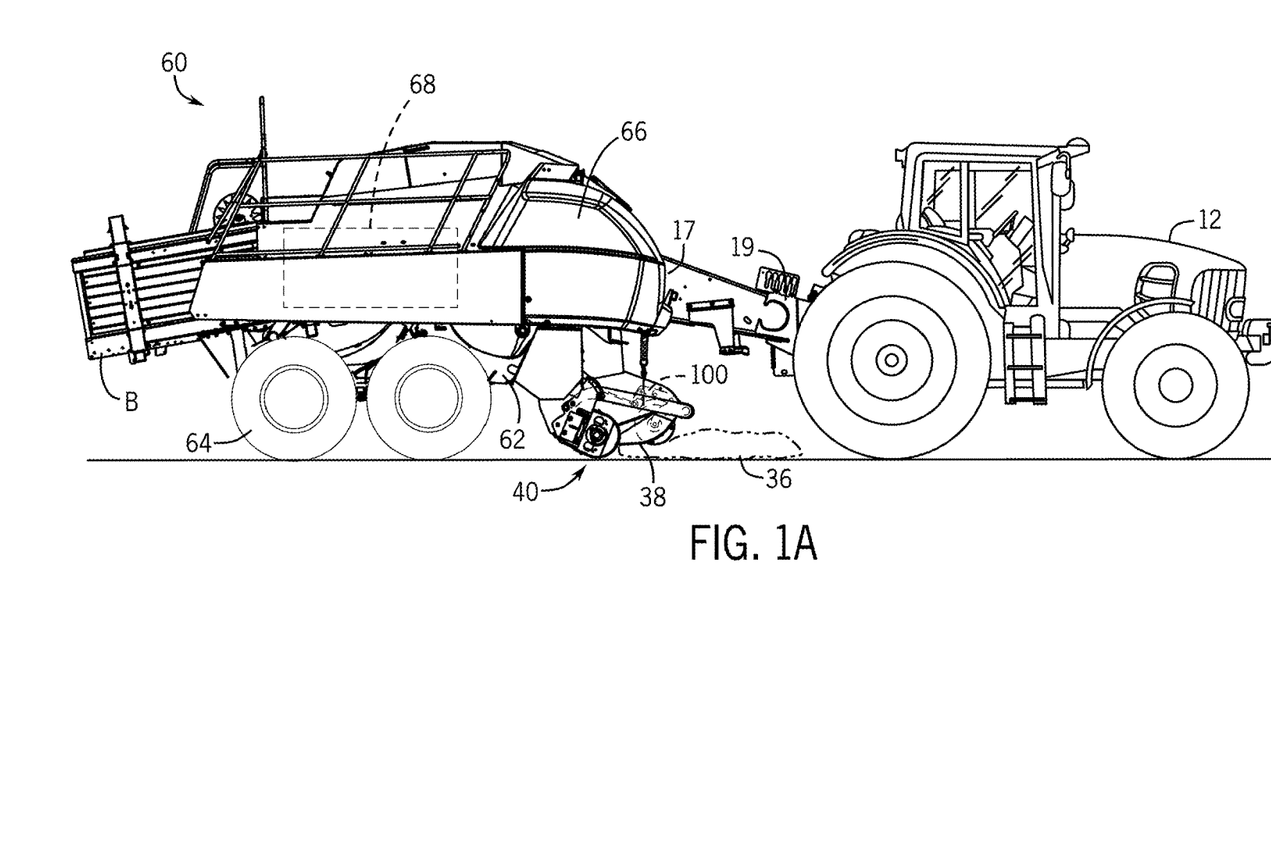
FIG. 1A is a perspective view of an example work vehicle in the form of a tractor, which includes an exemplary crop-packaging device, such as a baler, having the baffle float system according to various embodiments of this disclosure.

In other embodiments, with reference to FIG. 1A, a large square baler 60 of is depicted, which includes the pickup 40 and the baffle float system 100. Similar to the baler 10, the baler 60 is configured to be towed by the tractor 12. The baler 60 may have a main frame 62 supported on a pair of ground wheels 64. The main frame 62 includes the draft tongue 17 having a rear end joined to the main frame 62 and a forward end defined by the clevis arrangement 19 adapted for being coupled to a drawbar (not shown) of the tractor 12.

As the baler 60 moves across a field (e.g., as towed by the tractor 12 via the draft tongue 17) and encounters a windrow or other arrangement of material (not shown), the pickup 40 may gather the crop material 36 and move it from the crop inlet 38 into a housing 66 for processing into the bale B. In certain configurations, a plunger (not shown in FIG. 1A) may successively compress flakes of crop material within a bale forming chamber 68 until the bale B has been fully formed. Before the formed bale B is ejected from the rear of the housing 66, and while the bale B is still inside the bale forming chamber 68, the bale B may be wrapped with twine (or other material) and the twine tied by a knotter (not shown in FIG. 1A).

Figure 2:
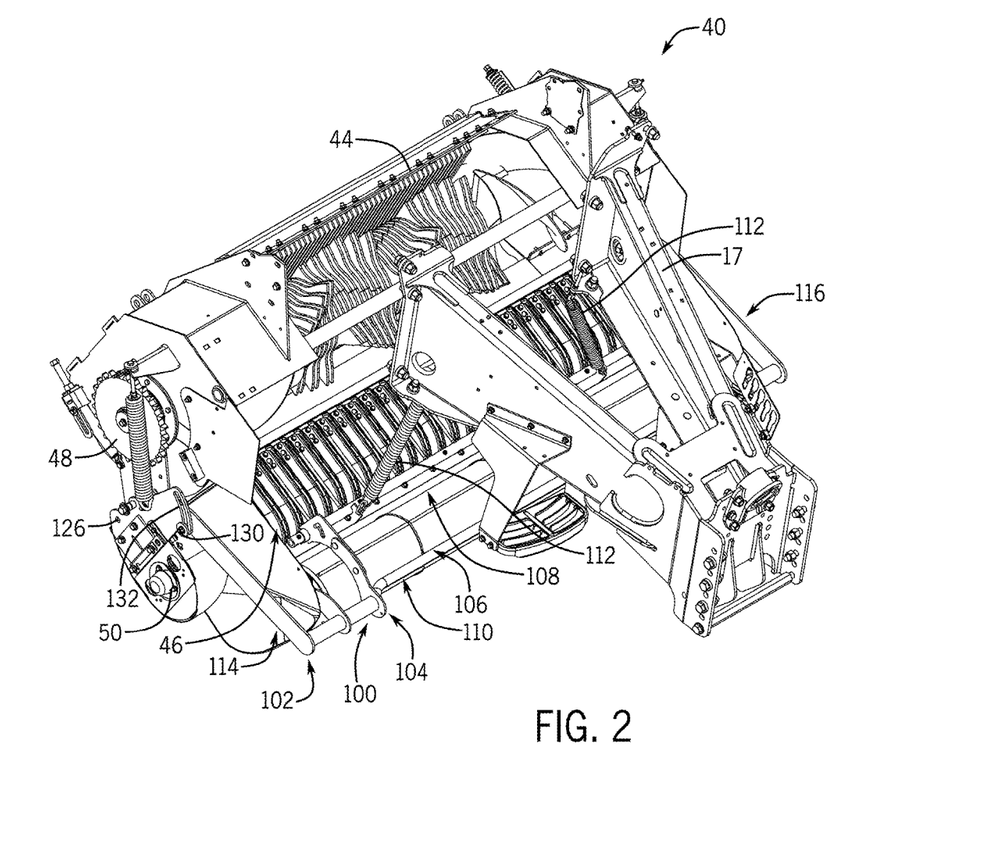
FIG. 2 is a perspective view a draft tongue and a pickup of the baler of FIGS. 1 and 1A, which includes the baffle float system.

With reference to FIG. 2, the pickup 40 is shown in greater detail. The pickup 40, and the baffle float system 100, may be employed with either the round baler 10 (FIG. 1) or the square baler 60 (FIG. 1A). The pickup 40 includes an auger shaft 44, a plurality of pickup teeth 46 and the baffle float system 100. The auger shaft 44 is driven by a suitable drive mechanism, such as a drive chain coupled to a sprocket 48. The drive chain may be coupled to an output shaft of a motor (not shown). The auger shaft 44 directs cut material from the pickup teeth 46 into the bale forming chamber 22 (FIG. 1) or bale forming chamber 68 (FIG. 1A). The pickup teeth 46 are coupled to a roller 50 (see also FIG. 5), which is driven by a suitable drive mechanism, such as a motor (not shown). The roller 50 rotates the pickup teeth 46 to direct the crop material 36 into the baler 10 (FIG. 1) or baler 60 (FIG. 1A). The pickup teeth 46 are generally elongated tines that extend outwardly from the baler 10 to be near a ground surface to guide the crop material 36 into the baler 10 (FIG. 1) or baler 60 (FIG. 1A). The pickup teeth 46 may also be spring loaded to assist in directing the crop material 36 into the bale forming chamber 22 (FIG. 1) or bale forming chamber 68 (FIG. 1A).

Figure 3:
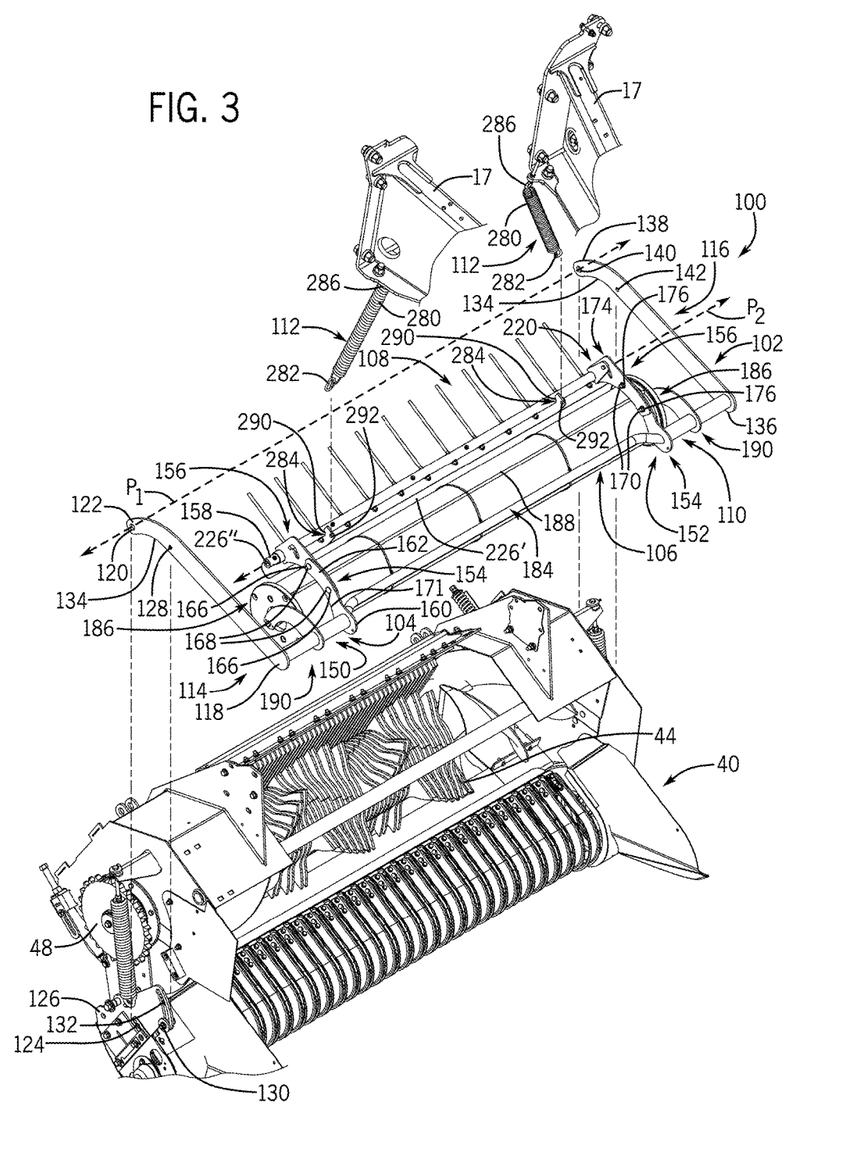
FIG. 3 is a partially exploded view of the pickup of the baler of FIGS. 1 and 1A.
Figure 5:
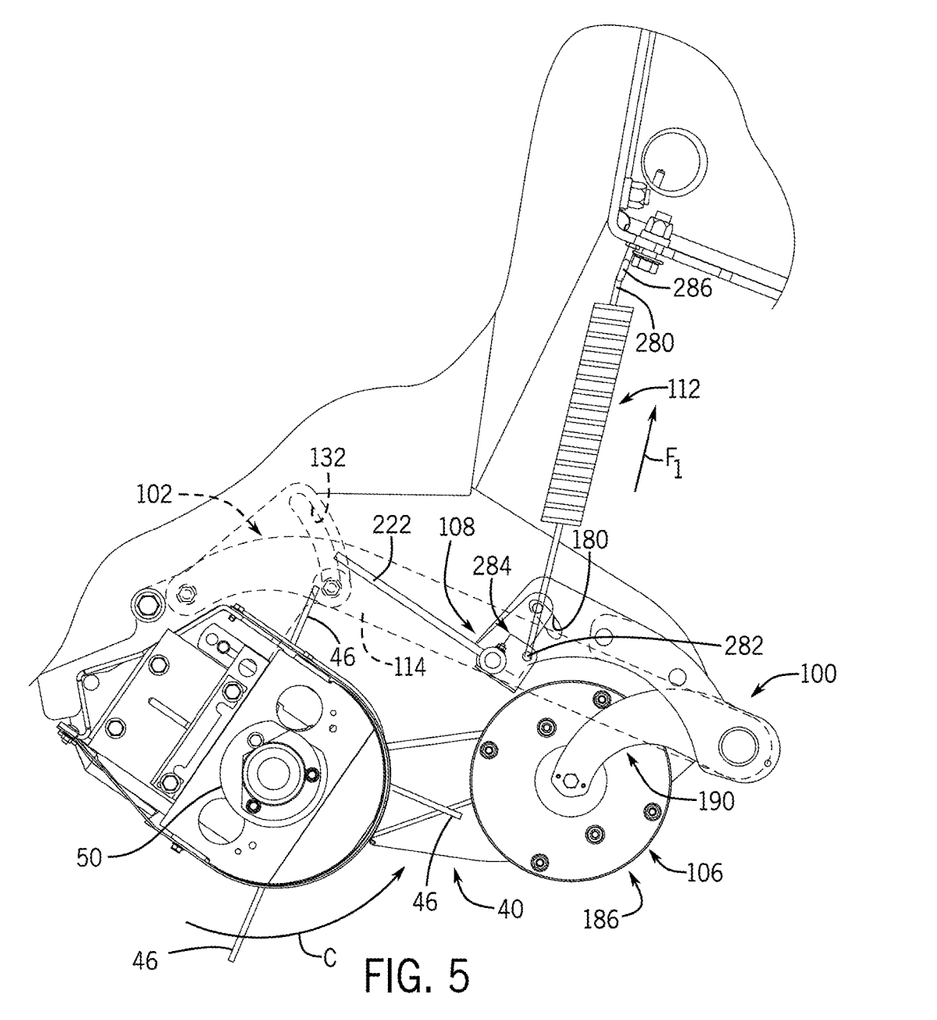
FIG. 5 is a side view of the pickup of the baler of FIGS. 1 and 1A, in which a compressor rack, a pair of primary pivot arms and a biasing member is in a first position.

The baffle float system 100 is spaced apart from the pickup teeth 46 (FIG. 5). The baffle float system 100 cooperates with the pickup teeth 46 to direct the crop material 36 toward the auger shaft 44. With reference to FIG. 3, the baffle float system 100 includes a pair of first or primary pivot arms 102, a pair of second or secondary pivot arms 104, a baffle roller 106, a compressor rack 108, a cross-member 110 and a pair of biasing members or springs 112. For ease of illustration, the pickup teeth 46 are not shown in FIG. 3.

The pair of first or primary pivot arms 102 includes a first primary arm 114 and a second primary arm 116. The first primary arm 114 and the second primary arm 116 are each composed of a metal or a metal alloy, and may be cast, forged, stamped, etc. The first primary arm 114 has a first end 118 and an opposite, second end 120. The first end 118 is coupled to the cross-member 110, via welding, for example. The second end 120 defines a first pivot bore 122 that receives a first pin 124 to movably couple the first primary arm 114 to a frame 126 that supports the pickup teeth 46. The first primary arm 114 pivots about a first pivot axis $P_1$ defined through the first pivot bore 122. The first primary arm 114 also includes a bore 128. The bore 128 is defined on the first primary arm 114 to be spaced apart from the second end 120. The bore 128 receives a second pin 130, and is movable within a slot 132 defined on the frame 126. The slot 132 defines the amount of pivotal movement of the first primary arm 114, and also guides the motion of the first primary arm 114. The first primary arm 114 also includes a curved portion 134 such that the first end 118 is offset from the second end 120 along a longitudinal axis defined by the first primary arm 114. The curved portion 134 enables the first primary arm 114 to be pivotally coupled to the frame 126. The first primary arm 114 is substantially planar from the first end 118 to the bore 128.

The second primary arm 116 has a first end 136 and an opposite, second end 138. The first end 136 is coupled to the cross-member 110, via welding, for example. The second end 138 defines a first pivot bore 140 that receives the first pin 124 (not shown) to movably couple the second primary arm 116 to an opposite side of the frame 126 that supports the pickup teeth 46. The second primary arm 116 pivots about the first pivot axis $P_1$ defined through the first pivot bore 140. The second primary arm 116 also includes a bore 142. The bore 142 is defined on the second primary arm 116 to be spaced apart from the second end 138. The bore 142 receives the second pin 130, and is movable within another slot 132, which is defined on the opposite side of the frame 126. Similar to the first primary arm 114, the slot 132 defines the amount of pivotal movement of the second primary arm 116, and also guides the motion of the second primary arm 116. The second primary arm 116 also includes the curved portion 134 such that the first end 136 is offset from the second end 138 along a longitudinal axis defined by the second primary arm 116. The curved portion 134 enables the second primary arm 116 to be pivotally coupled to the frame 126. The second primary arm 116 is substantially planar from the first end 136 to the bore 142.

The pair of second or secondary pivot arms 104 includes a first secondary arm 150 and a second secondary arm 152. The first secondary arm 150 and the second secondary arm 152 are each composed of a metal or a metal alloy, and may be cast, forged, stamped, etc. Each of the first secondary arm 150 and the second secondary arm 152 include a first arm member 154, a second arm member 156 and a bushing 158. It should be noted that while the first arm member 154 is shown separate and discrete from the second arm member 156, one or both of the first secondary arm 150 and the second secondary arm 152 may be an integral, monolithic arm, if desired.

The first arm member 154 has a first arm end 160 and an opposite, second arm end 162. The first arm end 160 is coupled to the cross-member 110, via welding, for example. In one example, a perimeter of a portion of the cross-member 110 is welded to the first arm end 160. The second arm end 162 includes one or more bores 166. In this example, the second arm end 162 includes two bores 166, which each receive a respective mechanical fastener 168 therethrough to couple the first arm member 154 to the second arm member 156. The mechanical fastener 168 may comprise a bolt, screw, etc., and a respective nut 170 may be used with each of the mechanical fasteners 168 to secure the mechanical fastener 168 to the first arm member 154 to the second arm member 156. A surface 171 of the first arm member 154 may be curved to enable the first arm member 154 to fit over the baffle roller 106.

Figure 4:
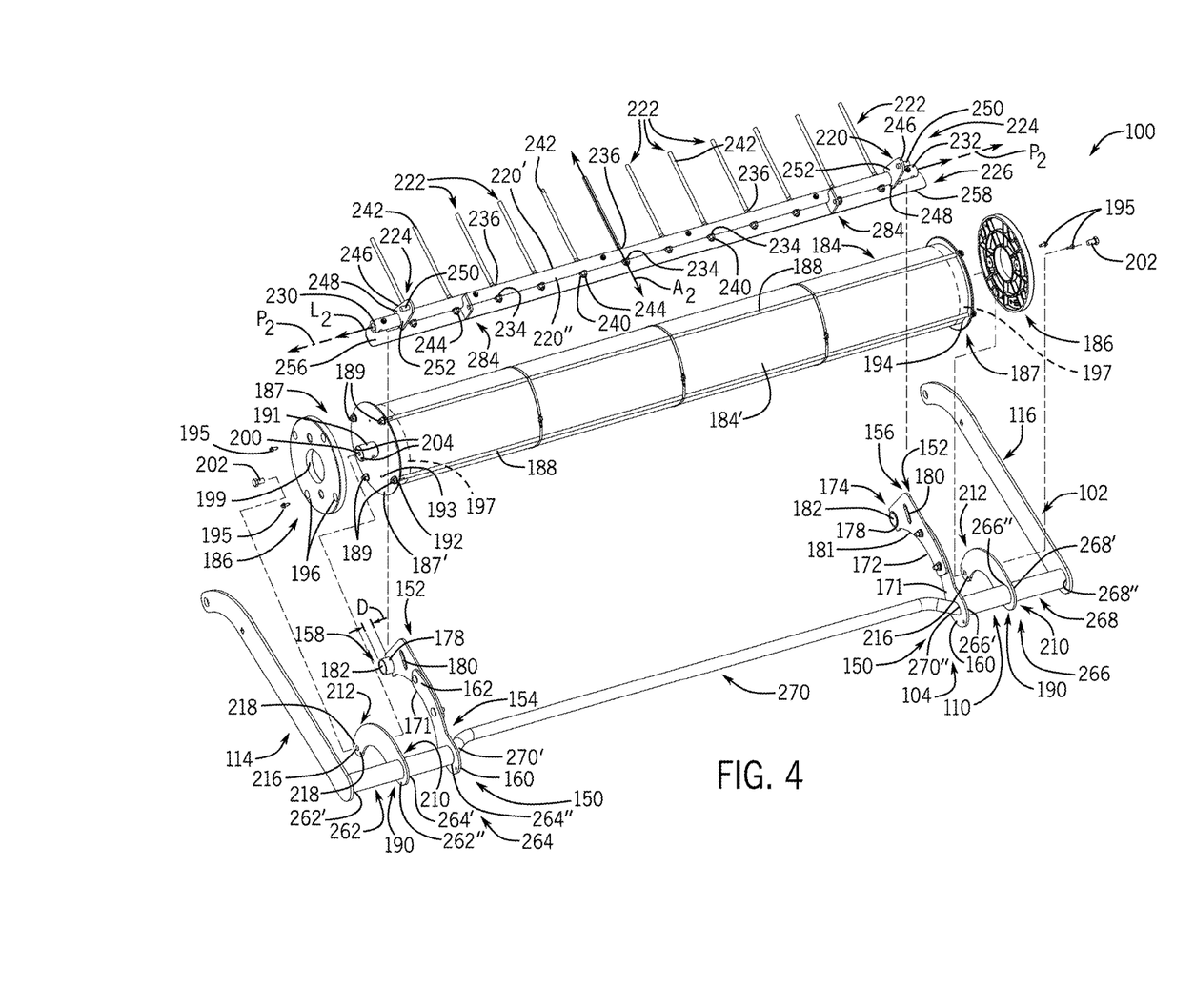
FIG. 4 is a partially exploded view of the baffle float system of the baler of FIGS. 1 and 1A.

The second arm member 156 includes a first arm end 172, and an opposite, second arm end 174. The first arm end 172 includes one or more bores 176. In this example, the second arm end 174 includes two bores 176, which receive the mechanical fastener 168 therethrough to couple the first arm member 154 to the second arm member 156. With reference to FIG. 4, the second arm end 174 defines a C-shaped groove 178 and a slot 180. The groove 178 receives the bushing 158. It should be noted that while the groove 178 is described herein as being C-shaped, the groove 178 may have any shape that corresponds with the shape of the bushing 158, and further, the second arm end 174 may also define a bore that receives the bushing 158 therethrough, if desired. The slot 180 is coupled to the compressor rack 108. The slot 180 defines a range of motion for the compressor rack 108 relative to the pair of second or secondary pivot arms 104. Generally, one end of the slot 180 is an up-stop and the other, opposite end is a down-stop. A surface 181 of the second arm member 156 may be curved to enable the second arm member 156 to fit over the baffle roller 106.

The bushing 158 is fixedly coupled to the groove 178. In one example, the bushing 158 is coupled to the groove 178 by welding. Generally, the bushing 158 is coupled to the groove 178 such that a portion of the bushing 158 extends outwardly a distance D from a surface of the first arm member 154. The outwardly extending portion extends the distance D toward the respective one of the primary pivot arms 102. The bushing 158 may be composed of a metal or a metal alloy, and may be forged, cast, stamped, etc. The bushing 158 is cylindrical, and defines a throughbore 182. The throughbore 182 receives a portion of the compressor rack 108.

The baffle roller 106 contacts the crop material 36 as it enters the pickup 40 and guides the crop material 36 toward the bale forming chamber 22. The baffle roller 106 includes a roller body 184, a pair of end caps 186, a pair of end disks 187, a plurality of rods 188 and a pair of mounting arms 190. The roller body 184 is substantially cylindrical, and has a first end 192 opposite a second end 194. The roller body 184 is composed of a polymeric material, and may be molded, extruded, printed, etc. A surface 184' of the roller body 184 is low friction for contacting the crop material 36. The roller body 184 may be hollow from the first end 192 to the second end 194 to reduce a weight of the baffle roller 106, if desired. The roller body 184 rotates relative to the section 270 of the cross-member 110. Generally, the roller body 184 is self-rolling such that the flow of the crop material 36 into the bale forming chamber 22 causes the roller body 184 to rotate.

In this embodiment, the roller body 184 also includes the pair of end disks 187, which are coupled to a respective one of the first end 192 and the second end 194 of the roller body 184. The end disks 187 each composed of a metal or metal alloy, and may be stamped, forged cast, extruded, printed, etc. The end disks 187 provide structural rigidity to the roller body 184. The end disks 187 are substantially circular, and may define a plurality of bores 189 surrounding a central hub 191. The bores 189 are generally spaced apart about a perimeter or circumference of the end disks 187. The rods 188 are received through a respective one of the bores 189 to couple the rods 188, and the roller body 184, to the end disks 187. One or more fastening bores 193 may also be defined through a surface 187' of the end disks 187 to couple a respective one of the end caps 186 to a respective one of the end disks 187, via one or more mechanical fasteners 195, for example.

The hub 191 is defined substantially at a center of each of the end disks 187. The hub 191 extends outwardly from a surface 187' of the end disks 187 and couples the end disks 187 to a respective one of the mounting arms 190. The hub 191 includes a bore 200, which receives a mechanical fastener 202. The mechanical fastener 202 couples the end disks 187 to the mounting arms 190. The hub 191 may also include a pair of tabs 204. The tabs 204 extend outwardly from the hub 191 on substantially opposite sides of the hub 191. The tabs 204 aid in coupling the end disks 187 to the mounting arms 190. Generally, one or more bearings 197 may be coupled to the hub within the roller body 184 at each of the first end 192 and the second end 194 of the roller body 184. The one or more bearings 197 enable the roller body 184 to rotate relative to the hub 191 and a section 270 of the cross-member 110, and also reduce friction during the rotation of the roller body 184.

The end caps 186 are each coupled to a respective one of the end disks 187. The end caps 186 each composed of a polymeric material, and may be molded, extruded, printed, etc. The end caps 186 are coupled to the end disks 187 via the one or more mechanical fasteners 195. The end caps 186 are substantially circular, and may define a plurality of bores 196 surrounding a central bore 199. The bores 196 are generally spaced apart about a perimeter or circumference of the end caps 186 to receive a portion of the rods 188 such that the ends of the rods 188 do not extend into the flow of crop material 36.

The rods 188 are each composed of a metal or a metal alloy, and may be extruded, cast, forged, stamped, etc. The rods 188 are received through and coupled to the bores 196 of each of the end caps 186. The rods 188 are cylindrical, and in one example, are coupled to the bores 196 by welding. The rods 188 may also be coupled by staking, etc. The rods 188 assist in retaining the roller body 184, and extend along the roller body 184 from the first end 192 to the second end 194.

The pair of mounting arms 190 couple the end caps 186 to the cross-member 110 such that the baffle roller 106 moves with the primary pivot arms 102. The mounting arms 190 are each composed of a metal or a metal alloy, and may be cast, forged, stamped, etc. The mounting arms 190 each include a first mounting end 210 and a second mounting end 212. Generally, the mounting arms 190 are curved from the first mounting end 210 to the second mounting end 212 such that the mounting arms 190 have a substantially C-shape. The first mounting end 210 is coupled to the cross-member 110, via welding, for example. In one example, a perimeter of a portion of the cross-member 110 is welded to the first mounting end 210.

The second mounting end 212 includes a coupling bore 216 and a pair of slots 218. The coupling bore 216 receives the mechanical fastener 202 for coupling the end caps 186, and thus, the roller body 184 to the cross-member 110. The slots 218 are spaced apart from the coupling bore 216 and receive a respective one of the tabs 204 of the end caps 186 to assist in coupling the end caps 186 to the respective one of the mounting arms 190.

The compressor rack 108 applies a downforce to the crop material 36 entering the pickup 40. The compressor rack 108 includes a shaft 220, a plurality of flexible rods 222, a pair of mounting brackets 224 and a scraper plate 226. The shaft 220 is composed of a metal or a metal alloy, and may be cast, forged, stamped, etc. The shaft 220 is generally hollow. The shaft 220 is cylindrical, and has a first shaft end 230 opposite a second shaft end 232. A plurality of first bores 234 and a plurality of second bores 236 are defined through the shaft 220 between the first shaft end 230 and the second shaft end 232. The first shaft end 230 is coupled to the bushing 158 of one of the secondary pivot arms 104, and the second shaft end 232 is coupled to the bushing 158 of the other of the secondary pivot arms 104. The shaft 220 rotates or pivots within the bushings 158. The shaft 220 extends along a longitudinal axis L2 from the first shaft end 230 to the second shaft end 232. The longitudinal axis L2 defines a second pivot axis P2.

The first bores 234 and the second bores 236 are defined through the shaft 220. Generally, the first bores 234 and the second bores 236 are spaced apart along the longitudinal axis L2 of the shaft 220 from the first shaft end 230 to the second shaft end 232. Each of the first bores 234 are coaxially aligned with a respective one of the second bores 236. Generally, each of the first bores 234 are coaxially aligned with the respective one of the second bores 236 along an axis A2. The axis A2 is substantially perpendicular to the longitudinal axis L2. A respective one of the flexible rods 222 is received through each of the coaxially aligned first bores 234 and second bores 236.

The flexible rods 222 apply a downforce to the crop material 36 as it flows toward the bale forming chamber 22. The flexible rods 222 are each composed of a metal or a metal alloy, and may be extruded, cast, forged, stamped, etc. The flexible rods 222 have a first rod end 240 and a second rod end 242. The first rod end 240 may be threaded, and may be coupled to a nut 244 to securely couple the respective flexible rod 222 to the shaft 220.

The mounting brackets 224 couple the shaft 220 to the secondary pivot arms 104. The mounting brackets 224 each include a first end 246 and an opposite, second end 248. The first end 246 includes a post 250. The post 250 is slidably received within the slot 180 and cooperates with the slot 180 to guide the movement of the shaft 220. Stated another way, the slot 180 defines a range of pivotal motion of the shaft 220 relative to the secondary pivot arms 104. The second end 248 defines a concave opening 252, which is sized to be positioned about a portion of the circumference of the shaft 220. The second end 248 may be coupled to the shaft 220 via welding, for example. Alternatively, the second end 248 may defined a bore, which receives the shaft 220. The second end 248 is also coupled to the scraper plate 226. In one example, the second end 248 is coupled to the scraper plate 226 by welding, etc.

The scraper plate 226 is substantially planar, and extends along a longitudinal axis that is substantially parallel to the longitudinal axis L2. The scraper plate 226 generally extends for an entire length of the shaft 220. The scraper plate 226 is composed of a metal or a metal alloy, and may be cast, forged, stamped, etc. The scraper plate 226 has a first end 256 opposite a second end 258. The first end 256 is coupled to the shaft 220, and the second end 258 is coupled to the other end of the shaft 220.

The cross-member 110 provides a frame for the baffle float system 100. The cross-member 110 includes a plurality of cylindrical portions or sections 260, which are coupled to various portions of the baffle float system 100, via welding for example, to define the frame. In this example, the cross-member 110 includes five sections 262-270. Each of the sections 262-270 are composed of a metal or a metal alloy, and may be cast, forged, stamped, extruded, etc. Four of the sections 262-268 are cylindrical, and extend along an axis. The section 262 has a first end 262' coupled to the first primary arm 114 and a second end 262" coupled to one of the mounting arms 190. The section 264 has a first end 264' coupled to the one of the mounting arms 190 and a second end 264" coupled to the first arm member 154 of one of the secondary pivot arms 104. The section 266 has a first end 266' coupled to the first arm member 154 of the other of the secondary pivot arms 104 and a second end 266" coupled to the other of the mounting arms 190. The section 268 has a first end 268' coupled to the other of the mounting arms 190 and a second end 268" coupled to the second primary arm 116. The sections 262-268 have a diameter and a length, which is different than a diameter and a length of the section 270.

The section 270 has a first end 270' coupled to one of the secondary pivot arms 104 and a second end 270" coupled to the other one of the secondary pivot arms 104. The section 270 may be curved at each of the first end 270' and the second end 270"; however, the section 270 may also be substantially straight. The diameter of the section 270 is smaller than the diameter of the sections 262-268, and the length is greater than the length of the sections 262-268. Generally, the section 270 extends for the length that is slightly less than a length of the shaft 220.

With reference to FIG. 3, the springs 112 enable the baffle float system 100 to move or float based on an amount of crop material 36 that enters the pickup 40. It should be noted that while the baffle float system 100 is described and illustrated herein as comprising two springs 112, the baffle float system 100 may include more or less biasing members. In this example, the springs 112 are each coil extension springs, which are composed of spring steel. As will be discussed, the springs 112 provide a force that resists the movement of the baffle float system 100 by the crop material 36. The springs 112 include a first end 280 and a second end 282. The first end 280 and the second end 282 may each comprise hooks, to enable the springs 112 to be coupled to the baler 10 and a pair of spring mounting brackets 284 of the baffle float system 100. In one example, the first end 280 of each of the springs 112 is coupled to an eyebolt 286 mounted on a portion of the draft tongue 17. The second end 282 of each of the springs 112 is coupled to a respective one of the spring mounting brackets 284. It should be noted that the first end 280 of each of the springs 112 may be coupled to a chain link coupled to the eyebolt 286 to enable the tension of the springs 112 to be adjustable (i.e. by enabling the first end 280 to be coupled to one of the chain links and/or the eyebolt 286).

The spring mounting brackets 284 are each coupled to the shaft 220. Generally, the spring mounting brackets 284 are coupled to the shaft 220 to be positioned on a side 220' of the shaft 220 that is opposite from a side 220" of the shaft 220 that is coupled to the mounting brackets 224. Thus, the spring mounting brackets 284, and the springs 112, are offset from the second pivot axis P2, and are offset from the first pivot axis P1. The springs 112 are coupled to the spring mounting brackets 284 to be behind the second pivot axis P2. The spring mounting brackets 284 are coupled to the shaft 220 which rotate or pivot together within the bore 182 of the bushing 158. The spring mounting brackets 284 also include a bore 292, which receives the second end 282 of a respective one of the springs 112.

With the components of the baffle float system 100 formed, the baffle float system 100 may be assembled and coupled to the baler 10 (FIG. 1) or baler 60 (FIG. 1A). In one example, the mounting brackets 224 are welded to the shaft 220. The flexible rods 222 are coupled to the bores 236, 238 defined through the shaft 220 and respectively secured with the nut 244. The shaft 220 is inserted through the bore 182 of the bushing 158. The cross-member 110 is assembled by welding the sections 262-270 to the respective ones of the first primary arm 114, the mounting arms 190, the first arm members 154 and the second primary arm 116. The roller body 184 is coupled to the end disks 187, and the rods 188 are inserted through the end disks 187. The end caps 186 are coupled to the end disks 187. The hub 191 of the end disks 187 is coupled to the mounting arms 190. The bushings 158 are welded to the second arm members 156. The secondary pivot arms 104 are assembled by coupling the first arm member 154 to the second arm member 156. The posts 250 are positioned within the slots 180. The first primary arm 114 and the second primary arm 116 are each coupled to the frame 126. The second end 282 of the springs 112 is coupled to the bore 292 of the respective spring mounting bracket and the first end 280 of the springs 112 is coupled to the respective eyebolt 286.

With the baffle float system 100 coupled to the baler 10 (FIG. 1) or baler 60 (FIG. 1A), with reference to FIG. 5, the baffle float system 100 is illustrated with the compressor rack 108 and the springs 112 in a first position. In the first position, the shaft 220 and the flexible rods 222 are not rotated relative to the secondary pivot arms 104. The springs 112 maintain the roller body 184 near the pickup teeth 46 to assist in guiding the crop material 36 into the baler 10. The springs 112 each exert a force F1, the resultant of which acts down on the compressor rack 108 to maintain a position of the flexible rods 222 and acts up on the baffle roller 106. The crop material 36 enters the pickup 40 in the direction of the arrow C. In the first position of the springs 112, the primary pivot arms 102 are in a first position within the slot 132.

Figure 6:
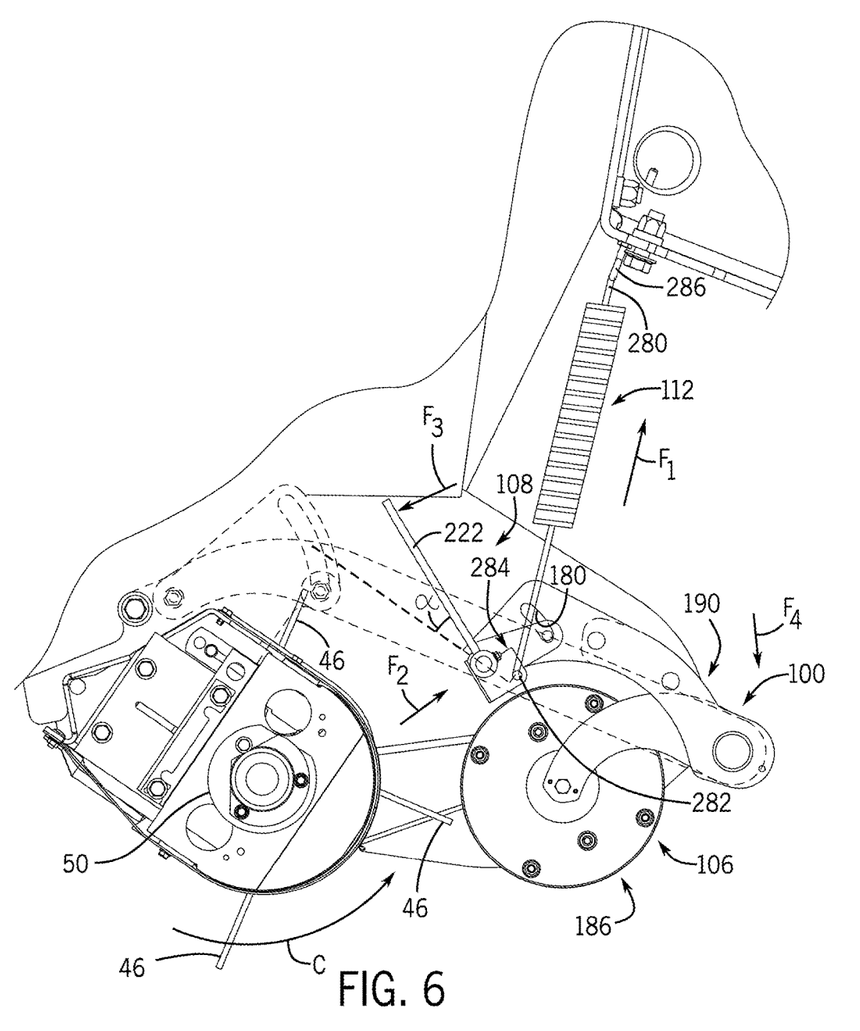
FIG. 6 is a side view of the pickup of the baler of FIGS. 1 and 1A, in which the compressor rack is in a second position, the pair of primary pivot arms are in the first position and the biasing member is in the first position.

With reference to FIG. 6, the baffle float system 100 is illustrated with the compressor rack 108 in a second position and the springs 112 in the first position. In the second position, a force F2 of the crop material 36 has pivoted the shaft 220. In this example, the shaft 220 has pivoted such that the flexible rods 222 have moved an angle α relative to the position in FIG. 5. The angle α is the maximum amount of angular movement for the flexible rods 222 and the shaft 220 as defined by the slot 180. In one example, the angle α is about 26 degrees. It should be noted that the shaft 220 and the flexible rods 222 are movable to various positions between the first position (FIG. 5) and the second position. In this example, the input of the force F2 of the crop material 36 combined with the force F1 of the springs 112 results in resultant forces F3 and F4. The resultant force F3 acts down on the compressor rack 108, while the resultant force F4 acts down on the baffle roller 106.

Figure 7:
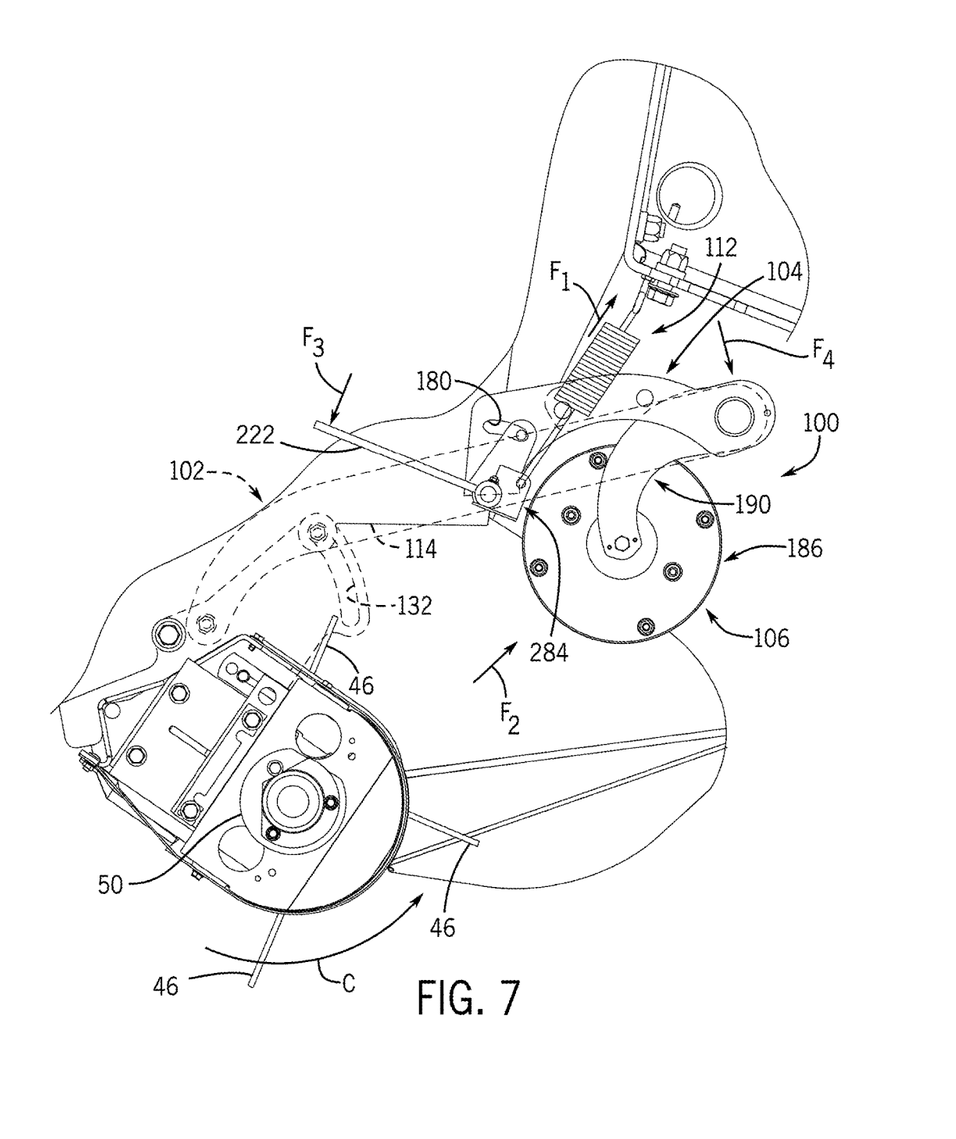
FIG. 7 is a side view of the pickup of the baler of FIGS. 1 and 1A, in which the compressor rack is in the second position, the pair of primary pivot arms is in a second position and the biasing member is in a second position.

With reference to FIG. 7, the baffle float system 100 is illustrated with the compressor rack 108 in the second position and the springs 112 in a second position. In the second position, the force F2 of the crop material 36 has pivoted the shaft 220 and has overcome the force F1 of the springs 112. Generally, the force F2 of the crop material 36 must exceed a certain force (e.g., about 20 pounds (lbs.)) to overcome the force F1 of the springs 112. In the second position of the springs 112, the primary pivot arms 102 have moved to a second position, which is limited by the slot 132. It should be noted that the primary pivot arms 102 are movable to various positions between the first position (FIG. 5) and the second position. By moving the primary pivot arms 102 and the compressor rack 108 to the second position, the baffle float system 100 automatically adjusts to inhibit a plugging of the pickup 40 due to the conditions of the crop material 36. In this example, the input of the force F2 of the crop material 36 combined with the force F1 of the springs 112 results in smaller resultant force F3 and higher resultant force F4. The resultant force F3 acts down on the compressor rack 108, while the resultant force F4 acts down on the baffle roller 106.

It should be understood that the foregoing example motion of the baffle float system 100 is an example, as the applied force F1 of the springs 112 determines when/if the compressor rack 108 will pivot before/after the baffle roller 106 and the primary pivot arms 102 move or pivot. Thus, in the example of FIGS. 5-7, the 20 lbs. force applied by the springs 112 enables the compressor rack 108 to pivot prior to the baffle roller 106 and the primary pivot arms 102 pivoting. In other embodiments, in which the force F1 of the springs 112 is greater and/or a lever arm applied to the compressor rack 108 by a mounting location of the springs 112 is greater, the compressor rack 108 is held down by a greater resultant force F3 from the springs 112, which in turn, applies less resultant force F4 to the baffle roller 106, thereby enabling the baffle roller 106 to pivot via the primary pivot arms 102 prior to the compressor rack 108 pivoting.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:
1. A baffle float system for a baler, comprising:
   a pair of first pivot arms configured to pivotally couple to a frame of the baler and to a cross-member, the first pivot arms pivot about a first pivot axis;
   a baffle coupled to the cross-member;
   a pair of second pivot arms having a first end coupled to the cross-member and a second end;
   a compressor rack coupled to the second end of each of the second pivot arms such that the compressor rack pivots relative to the second end along a second pivot axis, the second pivot axis different than the first pivot axis; and at least one biasing member coupled to the compressor rack so as to be offset from the second pivot axis.

2. The baffle float system of claim 1, wherein an input force of the at least one biasing member results in a resultant force that acts on the compressor rack and on the baffle.

3. The baffle float system of claim 1, wherein the compressor rack includes a pair of mounting brackets, which are coupled to the second pivot arms.

4. The baffle float system of claim 3, wherein each of the mounting brackets include a post, which is received within a slot defined in each of the second pivot arms to guide the pivotal movement of the compressor rack.

5. The baffle float system of claim 3, wherein the compressor rack includes a shaft and a plurality of flexible rods coupled to the shaft, and the mounting brackets are coupled about a portion of the shaft.

6. The baffle float system of claim 1, further comprising a pair of mounting arms each having a first end coupled to the baffle and a second end coupled to the cross-member to couple the baffle to the cross-member.

7. The baffle float system of claim 1, wherein the pair of second pivot arms each include a first arm member coupled to a second arm member, each of the second arm members is coupled to a bushing, and a portion of the compressor rack is movable within the bushing.

8. The baffle float system of claim 1, wherein the at least one biasing member comprises a pair of springs.

9. The baffle float system of claim 1, wherein the at least one biasing member has a first end and a second end, the first end coupled to the compressor rack and the second end is coupled to a frame of the baler.

10. A baffle float system for a baler, comprising:
a pair of first pivot arms configured to pivotally couple to a frame of the baler and to a cross-member, the first pivot arms pivot about a first pivot axis;
a baffle coupled to the cross-member;
a pair of second pivot arms having a first end coupled to the cross-member and a second end;
a compressor rack having a shaft with a plurality of flexible rods extending through the shaft, the shaft having a first shaft end and a second shaft end each coupled to the second end of a respective one of the second pivot arms and the shaft pivots relative to the second end along a second pivot axis, the second pivot axis different than the first pivot axis; and
a pair of springs coupled to the compressor rack so as to be spaced apart from the shaft and offset from the second pivot axis.

11. The baffle float system of claim 10, wherein the compressor rack includes a scraper plate, and each of the springs are coupled to a respective one of a pair of spring mounting brackets coupled to the scraper plate.

12. The baffle float system of claim 10, wherein the compressor rack includes a pair of mounting brackets, which are coupled to the second pivot arms.

13. The baffle float system of claim 12, wherein each of the mounting brackets include a post, which is received within a slot defined in each of the second pivot arms to guide the pivotal movement of the compressor rack.

14. The baffle float system of claim 13, wherein the mounting brackets are coupled about a portion of the shaft.

15. The baffle float system of claim 10, further comprising a pair of mounting arms each having a first end coupled to the baffle and a second end coupled to the cross-member to couple the baffle to the cross-member.

16. The baffle float system of claim 10, wherein the pair of second pivot arms each include a first arm member coupled to a second arm member, each of the second arm members is coupled to a bushing, and a portion of the compressor rack is movable within the bushing.

17. The baffle float system of claim 10, wherein each of the springs has a first end and a second end, with the first end of each of the springs coupled to the compressor rack and the second end of each of the springs coupled to the frame of the baler.

18. A baffle float system for a baler, comprising:
a pair of first pivot arms configured to pivotally couple to a frame of the baler and to a cross-member, the first pivot arms pivot about a first pivot axis;
a baffle coupled to the cross-member;
a pair of second pivot arms having a first end coupled to the cross-member and a second end;
a compressor rack having a shaft with a plurality of flexible rods extending through the shaft, the shaft having a first shaft end and a second shaft end each coupled to the second end of a respective one of the second pivot arms and the shaft pivots relative to the second end along a second pivot axis, the second pivot axis different than the first pivot axis; and
a pair of springs each having a first end and a second end, the first end coupled to the compressor rack so as to be spaced apart from the shaft and offset from the second pivot axis, and the second end of each of the springs coupled to the frame of the baler.

19. The baffle float system of claim 18, wherein the compressor rack includes a pair of mounting brackets, which are coupled to the second pivot arms, and each of the mounting brackets include a post, which is received within a slot defined in each of the second pivot arms to guide the pivotal movement of the compressor rack.

20. The baffle float system of claim 19, wherein the compressor rack includes a scraper plate coupled to a shaft of the compressor rack, and each of the springs are coupled to a respective one of a pair of spring mounting brackets coupled to the shaft of the compressor rack, the spring mounting brackets spaced apart from the mounting brackets.

* * * * *